United States Patent [19]
Haak et al.

[11] 3,990,528
[45] Nov. 9, 1976

[54] EPICYCLIC FINAL DRIVE FOR TRACK-TYPE VEHICLES

[75] Inventors: Willard J. Haak; Rollin P. Vanzandt, both of Peoria, Ill.

[73] Assignee: Caterpillar Tractor Co., Peoria, Ill.

[22] Filed: June 30, 1975

[21] Appl. No.: 591,663

[52] U.S. Cl. .................................. 180/9.62; 74/801
[51] Int. Cl.² .......................................... F16H 1/36
[58] Field of Search ............ 180/9.62, 66 R; 74/801, 74/802, 405; 188/170

[56] References Cited
UNITED STATES PATENTS

| | | | |
|---|---|---|---|
| 2,939,346 | 6/1960 | McCarthy | 74/801 |
| 2,978,051 | 4/1961 | Risk | 180/9.62 |
| 3,774,477 | 11/1973 | Murphy | 74/801 |

*Primary Examiner*—Philip Goodman
*Attorney, Agent, or Firm*—Phillips, Moore, Weissenberger, Lempio & Strabala

[57] ABSTRACT

A track-type vehicle comprises a track roller frame mounted on either side thereof and an endless track assembly mounted on each of the frames. An endless track assembly is entrained on the track roller frame and adapted to be driven by a sprocket operatively engaged therewith. The final drive for the sprocket comprises a rotatable input shaft having a sun gear secured thereon and meshing with a first set of planetary gears which react against a stationary first ring gear. Each gear of a second set of planetary gears is rotatably mounted on a rotatable carrier by a common shaft also having a respective gear of the first planetary gear set mounted thereon. The gears of the second planetary gear set mesh with a second ring gear rotatably mounted in the final drive and secured to the sprocket for simultaneous rotation therewith.

23 Claims, 1 Drawing Figure

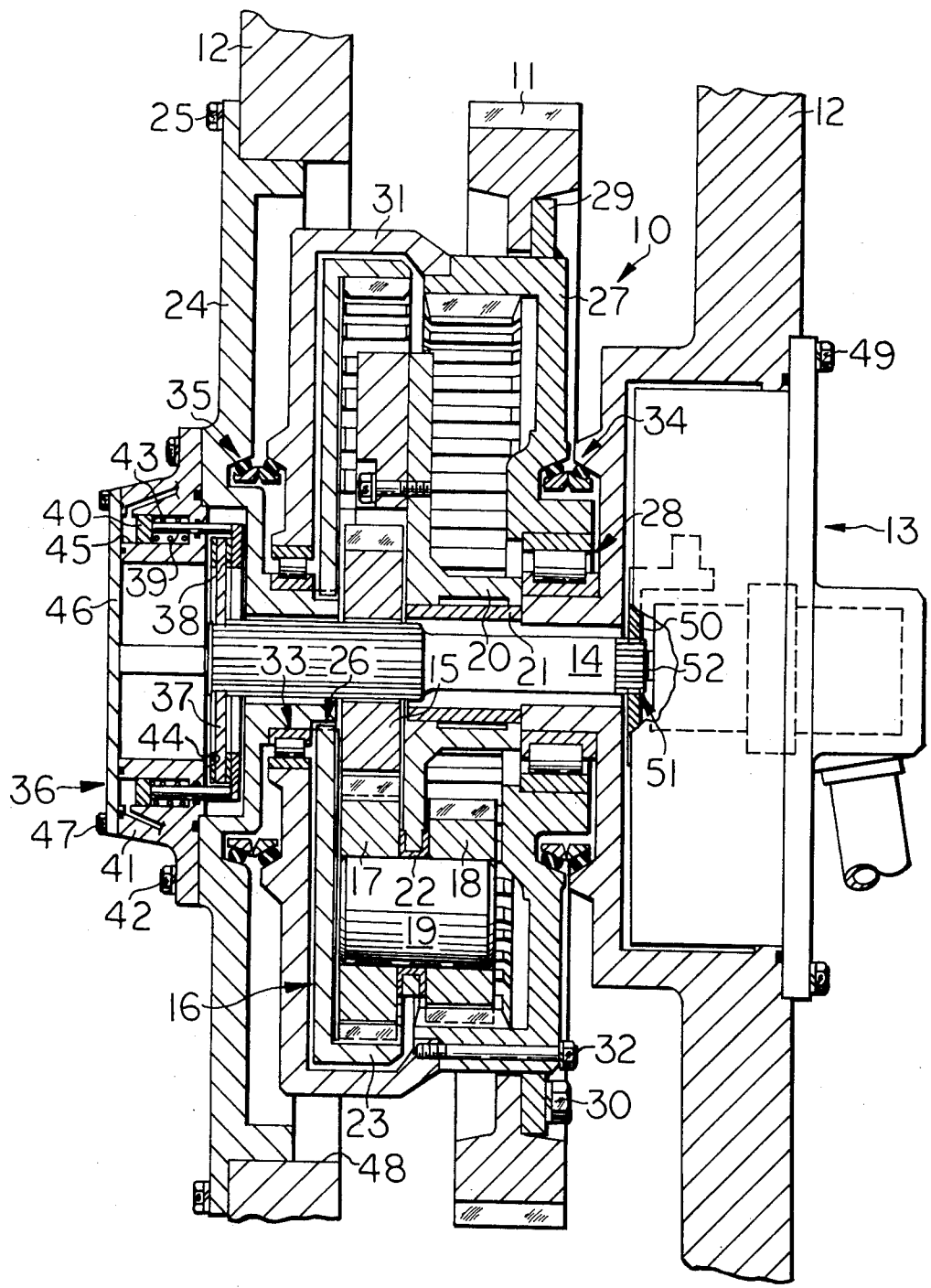

EPICYCLIC FINAL DRIVE FOR TRACK-TYPE VEHICLES

BACKGROUND OF THE INVENTION

The final drive for a track-type vehicle, such as a crawler tractor, comprises a power train operatively connected to a sprocket for driving an endless track assembly. The sprocket is normally rotatably mounted on the main frame of the vehicle which has a pair of track roller frames mounted on either side thereof with an endless track assembly carried by each of the track roller frames.

The drive train comprises a pair of meshing bevel gears which provide a common drive input to the sprocket via suitably arranged steering clutches, planetary gear sets and attendant mechanisms. Examples of such final drives are disclosed in U.S. Pat. Nos. 2,702,603; 2,939,346; and 2,978,051, all assigned to the assignee of this application. Further examples of conventional power trains wherein the final drive is mounted on the track roller frame are disclosed in U.S. Pat. Nos. 3,744,331 and 3,771,627, also assigned to the assignee of this application.

SUMMARY OF THIS INVENTION

An object of this invention is to provide a track-type vehicle with a compact and efficient final drive for each sprocket thereof which is adapted to be serviced expeditiously. In the preferred embodiment of this invention, each sprocket is rotatably mounted on a subframe mounted on a side of the vehicle for engagement with an endless track assembly mounted on the subframe. The final drive comprises a rotatable input shaft, a sun gear secured to the input shaft for rotation therewith and a cluster planetary gear set comprising at least one pair of first and second planetary gears secured on a common shaft for simultaneous rotation therewith. A carrier is rotatably mounted in the final drive and has the common shaft rotatably mounted thereon. A stationary first ring gear meshes with the first planetary gear whereas a rotatable ring gear, secured to the sprocket for simultaneous rotation therewith, meshes with the second planetary gear.

BRIEF DESCRIPTION OF THE DRAWING

Further objects of this invention will become apparent from the following description and accompanying drawing which is a sectional view of a final drive for the sprocket of a track-type vehicle.

Detailed Description

FIG. 1 illustrates a power transmission 10 of this invention which functions as a final drive for selectively rotating a sprocket 11 adapted to operatively engage an endless track (not show) of a track-type vehicle, such as a crawler tractor. Although the power transmission is particularly adapted for such use, it can also be utilized to drive a wheel of a vehicle, actuate the cable drum of a winch assembly or readily be adapted for use in other types of power transmitting apparatus. The tractor comprises a main frame (not shown) having a track roller frame or support 12 mounted on either side thereof in a conventional manner. The power input to the final drive preferably comprises a hydraulic motor means 13 suitably mounted on an inboard side of frame 12 to drive an input shaft 14, rotatably mounted on the frame.

The final drive is mounted between a pair of laterally spaced inboard and outboard members of frame 12 and comprises a sun gear 15 splined to an outboard end of shaft 14 for simultaneous rotation therewith. A cluster planetary gear set 16 comprises a first set of planetary gears 17 (one shown) and a second set of planetary gears 18 (one shown) with a respective pair of first and second gears of the two sets being secured to a common shaft 19 for simultaneous rotation therewith. A carrier 20 is rotatably mounted on a bearing bushing 21 secured in the final drive and has each shaft 19 rotatably mounted thereon by an annular bearing 22. A stationary first ring gear 23 meshes internally with first planetary gears 17 and is secured to an annular cover plate 24, attached to frame 12 by cap screws 25, at a spline connection 26.

A second ring gear 27 meshes internally with gears 18 of the second planetary gear set and is rotatably mounted on frame 12 by annular roller bearing means 28. An annular flange 29 is secured on the outer periphery of ring gear 27 to secure sprocket 11 thereto by means of a plurality of circumferentially disposed cap screws 30. Cup-shaped ring gear 27 is secured to a cup-shaped member 31 by a plurality of bolts 32 to define an annular housing therewith for enclosing and protecting the cluster planetary gear set and attendant mechanisms.

Member 31 is rotatably mounted on cover 24 by annular roller bearing means 33. A first annular dynamic sealing means 34 is disposed between frame 12 and ring gear 27 whereas a second annular dynamic sealing means 35 is disposed between the frame and member 31. Each sealing means preferably comprises a standard ring seal assembly of the type illustrated.

A normally "on" braking means 36 is operatively connectible between shaft 14 and cover 24 to prevent rotation of sprocket 11. Such braking means may comprise a friction disc 37 suitably splined to an outboard end of shaft 14 and an annular pressure plate 38 disposed between the friction disc and cover 24. The pressure plate is secured on inboard ends of circumferentially disposed rods 39, further having an annular piston 40 secured on outboard ends thereof. The rods and piston are reciprocally mounted on an annular member 41, secured to cover 24 by a plurality of circumferentially disposed cap screws 42.

A compression or retraction spring 43 is mounted on each rod 39 to normally urge piston 40 and thus pressure plate 38 leftwardly in the drawing to compress friction disc 37 against an inboard surface 44 of member 41. Upon selective pressurization of an annular actuating chamber 45, defined in member 41, piston 40 and pressure plate 38 will move rightwardly to release the braking means to thus permit input shaft 14 to rotate sprocket 11. A cover plate 46 is secured on an outboard end of member 41 by a plurality of circumferentially disposed cap screws 47.

From the above description it can be seen that the final drive of this invention is compact and is capable of providing an efficient gear reduction ratio up to 100:1 from input shaft 14 to sprocket 11. For example, a 34 gear reduction ratio may be provided wherein sun gear 15 has eighteen teeth, planetary gears 17 each have eighteen teeth, first ring gear 23 has fifty-four teeth, planetary gears 18 each have fifteen teeth and second ring gear 27 has fifty-one teeth.

Braking means 36, per se, can be expeditiously serviced upon removal of cover 24. The cluster planetary gear set and attendant mechanisms may be expeditiously serviced by removing the individual circumferentially disposed segments of sprocket 11 whereby the modular final drive can be removed as a unit through an annular opening 48 formed through an outboard side of frame 12. As shown in the drawing, the outer dimensions of the final drive are sized smaller than the opening to facilitate such removal.

Also, motor 13 can be expeditiously removed from frame 12 and shaft 14 upon removal of circumferentially disposed cap screws 49. The hydraulic motor may comprise a rotor or output member 50 suitably splined at 51 to an inboard end of shaft 14. A thrust washer 52, mounted in the motor, is adapted to abut and aid in positioning the shaft axially.

We claim:

1. In a track-type vehicle of the type comprising an endless track assembly and a rotatable sprocket operatively engaged with said track assembly for selectively rotating the same, final drive means mounted on a frame and operatively connected to said sprocket for selectively rotating the same comprising a rotatable input shaft, a sun gear secured to said shaft for rotation therewith, a cluster planetary gear set comprising at least one pair of first and second planetary gears secured on a common shaft for simultaneous rotation therewith, a rotatable carrier having said common shaft rotatably mounted thereon, a first ring gear secured to said frame and meshing with said first planetary gear and a second ring gear rotatably mounted on said frame and meshing with said second planetary gear, said second ring gear secured to said sprocket for simultaneous rotation therewith.

2. The vehicle of claim 1 wherein said frame constitutes a track roller frame and wherein said final drive means is mounted between a pair of laterally spaced inboard and outboard members of said track roller frame.

3. The vehicle of claim 2 further comprising an opening formed through said outboard member and a cover plate secured exteriorly on said outboard member to normally cover said opening and wherein outer dimensions of said final drive means are sized smaller than said opening to permit said final drive means to be moved therethrough upon removal of said cover plate.

4. The vehicle of claim 2 further comprising motor means detachably mounted exteriorly on said inboard member and operatively connected to said final drive means.

5. The vehicle of claim 4 wherein said motor means constitutes a hydraulic motor.

6. The vehicle of claim 1 wherein said final drive means further comprises a member rotatably mounted on said frame and secured to said second ring gear for simultaneous rotation therewith, said member and said second ring gear forming an annular housing enclosing said planetary gear set.

7. The vehicle of claim 6 further comprising annular sealing means disposed between said frame and each of said member and said second ring gear.

8. The vehicle of claim 1 further comprising normally engaged braking means mounted on said frame and operatively connectible with said input shaft for selectively braking rotation thereof relative to said frame.

9. The vehicle of claim 8 wherein said braking means comprises an annular friction disc attached to an outboard end of said shaft for rotation therewith.

10. The vehicle of claim 9 wherein said braking means further comprises an annular pressure plate mounted for axial movement on said frame between an outboard position compressing said disc against a stationary member attached to said frame and an inboard position releasing said disc for rotation with said shaft.

11. The vehicle of claim 10 wherein said braking means further comprises spring means operatively engaging said pressure plate for urging it towards said outboard position.

12. The vehicle of claim 11 further comprising a member releasably attached on an outboard side of said frame and defining an annular groove therein and wherein said braking means further comprises an annular piston disposed in said groove to define an annular actuating chamber, adapted to be pressurized by a hydraulic fluid, between said piston and said member, said piston secured to said pressure plate for selectively moving said pressure plate to its inboard position upon pressurization of said actuating chamber.

13. A power transmission mounted on a support comprising a rotatable input shaft, a sun gear secured to said shaft for rotation therewith, a cluster planetary gear set comprising at least one pair of first and second planetary gears secured on a common shaft for simultaneous rotation therewith, a rotatable carrier having said common shaft rotatably mounted thereon, a first ring gear secured to said support and meshing with said first planetary gear, a cup-shaped second ring gear rotatably mounted on said support and meshing with said second planetary gear and a cup-shaped member rotatably mounted on said support and secured to said second ring gear for simultaneous rotation therewith, said member and said second ring gear forming an annular housing enclosing said planetary gear set therein.

14. The power transmission of claim 13 further comprising a power take-off member secured exteriorly on said housing for simultaneous rotation therewith.

15. The power transmission of claim 13 further comprising an opening formed through said support and a cover plate secured exteriorly on said support to normally cover said opening and wherein outer dimensions of said power transmission are sized smaller than said opening to permit said power transmission to be moved therethrough upon removal of said cover plate.

16. The power transmission of claim 13 further comprising motor means detachably mounted exteriorly on said support and operatively connected to said input shaft.

17. The power transmission of claim 16 wherein said motor means constitutes a hydraulic motor.

18. The power transmission of claim 13 further comprising annular sealing means disposed between said support and each of said member and said second ring gear.

19. The power transmission of claim 13 further comprising normally engaged braking means mounted on said support and operatively connectible with said input shaft for selectively braking rotation thereof relative to said support.

20. The power transmission of claim 19 wherein said braking means comprises an annular friction disc attached to an outboard end of said shaft for rotation therewith.

21. The power transmission of claim 20 wherein said braking means further comprises an annular pressure plate mounted for axial movement on said support between an outboard position compressing said disc against a stationary member attached to said support and an inboard position releasing said disc for rotation with said shaft.

22. The power transmission of claim 12 wherein said braking means further comprises spring means operatively engaging said pressure plate for urging it towards said outboard position.

23. The power transmission of claim 22 further comprising a member releasably attached on an outboard side of said support and defining an annular groove therein and wherein said braking means further comprises an annular piston disposed in said groove to define an annular actuating chamber, adapted to be pressurized by a hydraulic fluid, between said piston and said member, said piston secured to said pressure plate for selectively moving said pressure plate to its inboard position upon pressurization of said actuating chamber.

* * * * *

UNITED STATES PATENT AND TRADEMARK OFFICE
CERTIFICATE OF CORRECTION

PATENT NO. : 3,990,528
DATED : November 9, 1976
INVENTOR(S) : WILLARD J. HAAK et al It is certified that error appears in the above–identified patent and that said Letters Patent are hereby corrected as shown below:

Col. 5, Claim 22, line 1, "12" should be --21--.

Signed and Sealed this twenty-sixth Day of July 1977

[SEAL]

Attest:

RUTH C. MASON
*Attesting Officer*

C. MARSHALL DANN
*Commissioner of Patents and Trademarks*